United States Patent [19]

Sanada et al.

[11] Patent Number: 5,478,873
[45] Date of Patent: Dec. 26, 1995

[54] THERMOPLASTIC RESIN COMPOSITION

[75] Inventors: Takashi Sanada, Ichihara; Hiroshi Hagimori, Niihama; Tetsuo Yamaguchi, Toyonaka; Motohiko Samizo, Osaka, all of Japan

[73] Assignee: Sumitomo Chemical Company, Limited, Osaka, Japan

[21] Appl. No.: 297,920

[22] Filed: Aug. 31, 1994

[30] Foreign Application Priority Data

Sep. 10, 1993 [JP] Japan .................................. 5-217793
Jun. 30, 1994 [JP] Japan .................................. 6-149672

[51] Int. Cl.$^6$ ...................................................... C08K 5/54
[52] U.S. Cl. ............................................ 524/103; 524/101
[58] Field of Search .................................... 524/101, 103

[56] References Cited

U.S. PATENT DOCUMENTS 4,232,131  11/1980  Rody et al. .......................... 525/184

(List continued on next page.)

FOREIGN PATENT DOCUMENTS 094048  11/1983  European Pat. Off. .

(List continued on next page.)

*Primary Examiner*—Shelley A. Dodson
*Attorney, Agent, or Firm*—Cushman Darby & Cushman

[57] ABSTRACT

The present invention provides a thermoplastic resin composition improved in stability at the time of processing which comprises (a) 100 parts by weight of a polyphenylene ether resin and (b) 0.001–15 parts by weight of at least one 4-amino-2,2,6,6-tetramethylpiperidyl compound represented by the following formula (I) or (II):

(I)

(II)

wherein $R_1$ represents a hydrogen atom, an oxygen atom (oxy radical), a hydroxyl group, an alkyl group, a cycloalkyl group, an allyl group, a benzyl group, an aryl group, an alkanoyl group, an alkenoyl group, an alkyloxy group or a cycloalkyloxy group;

$R_2$ represents a hydrogen atom, an alkyl group or $$-R_4C(-X-)R_5$$
(with O double-bonded to C)

where X represents a direct bond, —O— or —NH—, $R_4$ represents a direct bond, a straight or branched alkylene group, an alkylidene group or an arylene group, $R_5$ represents a hydrogen atom, an alkyl group, an aryl group, $$-CH=CHCOH$$
(with O double-bonded to C)

or (Abstract continued on next page.)

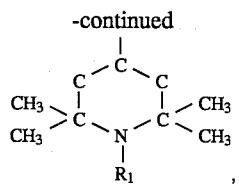

n represents an integer of 1 to 4, p represents an integer of 2 to 6, and $R_3$ represents a hydrogen atom or an n valent organic group.

17 Claims, 1 Drawing Sheet

U.S. PATENT DOCUMENTS

| | | | |
|---|---|---|---|
| 4,233,410 | 11/1980 | Rody et al. | 525/123 |
| 4,233,412 | 11/1980 | Rody et al. | 525/167 |
| 4,234,699 | 11/1980 | Rody et al. | 525/55 |
| 4,260,689 | 7/1981 | Rody et al. | 525/55 |
| 4,260,691 | 1/1981 | Rody et al. | 525/130 |
| 4,299,926 | 11/1981 | Rody et al. | 525/55 |
| 4,500,662 | 2/1985 | Lai | 524/99 |
| 4,601,839 | 7/1986 | Lai | 252/51.5 |
| 4,725,634 | 2/1988 | Ishii et al. | 524/103 |
| 5,004,759 | 4/1991 | Mutterer et al. | 524/89 |
| 5,049,604 | 9/1991 | Fujii et al. | 524/103 |
| 5,141,975 | 8/1992 | Enlow | 524/128 |
| 5,182,390 | 1/1993 | Sagawa et al. | 544/222 |
| 5,306,495 | 4/1994 | Cantatore et al. | 514/100 |
| 5,384,348 | 1/1995 | Kimura et al. | 514/100 |

FOREIGN PATENT DOCUMENTS

| | | |
|---|---|---|
| 134523 | 3/1985 | European Pat. Off. . |
| 146879 | 7/1985 | European Pat. Off. . |
| 149454 | 7/1985 | European Pat. Off. . |
| 146878 | 7/1985 | European Pat. Off. . |
| 151961 | 8/1985 | European Pat. Off. . |
| 229363 | 7/1987 | European Pat. Off. . |
| 233153 | 8/1987 | European Pat. Off. . |
| 240723 | 10/1987 | European Pat. Off. . |
| 313118 | 4/1989 | European Pat. Off. . |
| 024782 | of 0000 | Japan . |
| 02975363 | of 0000 | Japan . |
| 192454 | of 0000 | Japan . |
| 44-29751 | 12/1969 | Japan . |
| 46-24782 | of 1971 | Japan . |
| 149646 | 8/1985 | Japan . |
| 203150 | 9/1986 | Japan . |
| 2136805 | 9/1984 | United Kingdom . |

THERMOPLASTIC RESIN COMPOSITION

The present invention relates to a thermoplastic resin composition improved in stability of polyphenylene ether resin at the time of processing.

Polyphenylene ether resin is a thermoplastic resin superior in various characteristics such as mechanical properties, heat resistance and dimensional stability. However, it is apt to undergo coloration and deteriorations such as crosslinking when processed at high temperatures. Especially, in the presence of oxygen, it undergoes serious deterioration due to the heat to cause gelation or sometimes produce black specks. Furthermore, polyphenylene ether resin readily undergoes discoloration with light.

In order to offset these defects of the resin, it has been proposed to add various additives. For example, phosphorus additives are proposed in Japanese Patent Kokoku No. 44-29751 and phenolic additives are proposed in Japanese Patent Kokoku No. 46-24782. Furthermore, many attempts such as use of various compounds including steric hindrance type amines or use of compounds including steric hindrance type amines and phenolic additives in combination have been made mainly for inhibition of the discoloration with light as disclosed in Japanese Patent Kokai Nos. 60-149646 and 60-203150, U.S. Pat. Nos. 4,232,131, 4,233,410, 4,233,412, 4,234,699, 4,260,689, 4,260,691 and 4,299,926, EP0094048A2, EP0134523A1, EP0146879A2, EP0146878A2, EP0151961A1, EP0149454A2, EP0233153A2, EP0240723A2, EP0229363A2, and EP0313118A1. Many of these attempts are for improving evaporation at the time of processing or actual use, and various compounds containing steric hindrance type amines alone or copolymers (oligomers) with other components have been proposed. However, none of these proposals have provided sufficient effects to inhibit deterioration at heating.

The present invention relates to a composition inhibited from deterioration of the polyphenylene ether at the time of processing, especially with heat.

The inventors have found that a conspicuous effect to inhibit the deterioration with heat can be obtained by adding a compound containing steric hindrance type amine having a specific structure to polyphenylene ether resins.

The present invention relates to a thermoplastic resin composition comprising (a) 100 parts by weight of a polyphenylene ether and (b) 0.001–15 parts by weight of at least one 4-amino-2,2,6,6-tetramethylpiperidyl compound represented by the following formula (I) or (II)

(I)

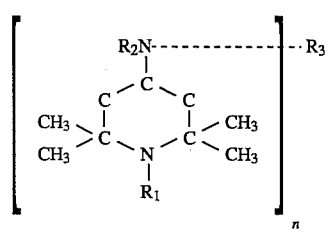

(II)

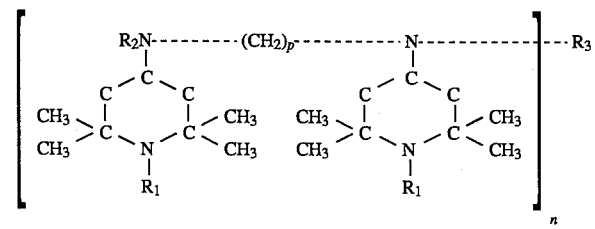

wherein $R_1$ represents a hydrogen atom, an oxygen atom (oxy radical), a hydroxyl group, an alkyl group, a cycloalkyl group, an allyl group, a benzyl group, an aryl group, an alkanoyl group, an alkenoyl group, an alkyloxy group, or a cycloalkyloxy group;

$R_2$ represents a hydrogen atom, an alkyl group or

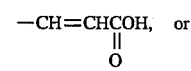

where X represents a direct bond, —O— or —NH—, $R_4$ represents a direct bond, a straight or branched alkylene group, an alkylidene group or an arylene group, $R_5$ represents a hydrogen atom, an alkyl group, an aryl group,

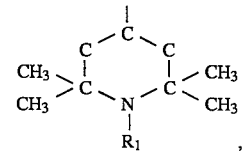

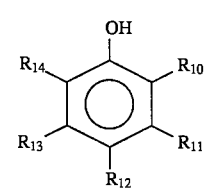

n represents an integer of 1 to 4, p represents an integer of 2 to 6, and $R_3$ represents a hydrogen atom or an n valent organic group.

Figure 1:
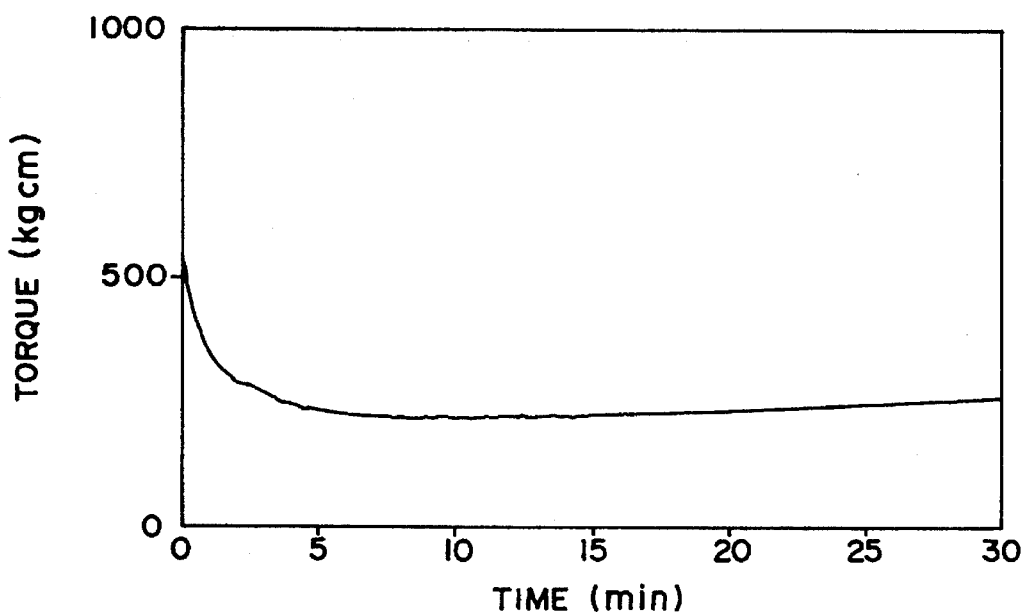
FIG. 1 is a graph which shows the change of torque with time at kneading in Example 1.

The polyphenylene ether resin (a) is a polymer obtained by oxidation polymerization of at least one phenol compound represented by the following formula with oxygen or a gas containing oxygen using an oxidation coupling catalyst:

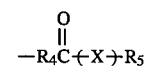

wherein $R_{10}$, $R_{11}$, $R_{12}$, $R_{13}$ and $R_{14}$ each represents a hydrogen atom, a halogen atom or a substituted or unsubstituted hydrocarbon group and at least one of them is a hydrogen atom.

Examples of $R_{10}$, $R_{11}$, $R_{12}$, $R_{13}$ and $R_{14}$ are hydrogen, chlorine, bromine, fluorine, iodine, methyl, ethyl, n- or iso-propyl, n-, sec- or t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of the compounds represented by the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol, and 2-methyl-6-allylphenol.

The phenol compounds of the above formula can also be copolymerized with other phenol compounds, for example, polyhydric aromatic compounds such as bisphenol A, tetrabromobisphenol A, resorcinol, hydroquinone and novolak resins.

As preferable examples of the polyphenylene ether resin (a), mention may be made of homopolymers of 2,6-dimethylphenol, homopolymers of 2,6-diphenylphenol, copolymers of a larger amount of 2,6-dimethylphenol and smaller amount of 3-methyl-6-t-butylphenol or 2,3,6-trimethylphenol.

Any oxidation coupling catalysts may be used for oxidation polymerization of the phenol compound as far as they have polymerization ability.

The 4-amino-2,2,6,6-tetramethylpiperidyl compound (b) having a steric hindrance type amino group as a basic skeleton is represented by the following formula (I) or (II):

(I)

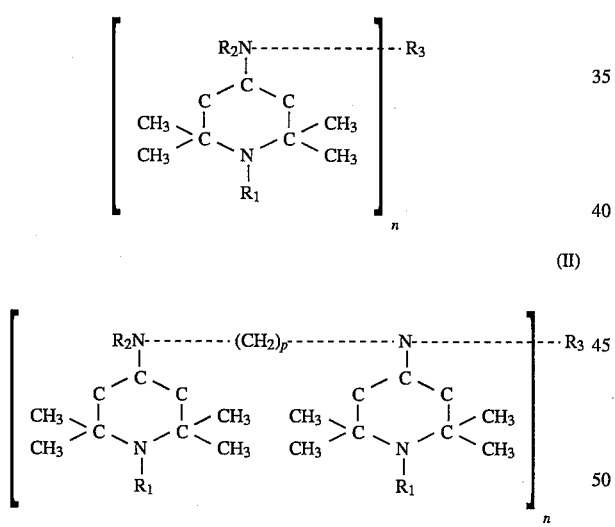

(II)

wherein $R_1$ represents a hydrogen atom, an oxygen atom (oxy radical), a hydroxyl group, an alkyl group, a cycloalkyl group, an allyl group, a benzyl group, an aryl group, an alkanoyl group, an alkenoyl group, an alkyloxy group, or a cycloalkyloxy group;

$R_2$ represents a hydrogen atom, an alkyl group or

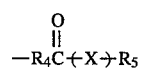

where X represents a direct bond, —O— or —NH—, $R_4$ represents a direct bond, a straight or branched alkylene group, an alkylidene group or an arylene group, $R_5$ represents a hydrogen atom, an alkyl group, an aryl group,

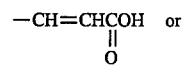 or

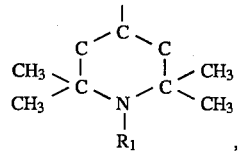

n represents an integer of 1 to 4, p represents an integer of 2 to 6, and $R_3$ represents a hydrogen atom or an n valent organic group.

Preferable examples of these 4-amino-2,2,6,6-tetramethylpiperidyl compounds are shown below.

[I] Compounds represented by the formula (I) or (II) wherein n is 1 and $R_3$ is a hydrogen atom, an alkyl group, a cycloalkyl group, an alkenyl group, a benzyl group, an aryl group or

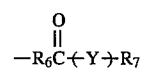

in which Y represents a direct bond, —O— or —$NR_8$— and $R_6$ represents a direct bond, a straight or branched alkylene group, an alkylidene group or an arylene group, and $R_7$ and $R_8$ each represents a hydrogen atom, a hydroxyl group, an alkyl group, an aryl group,

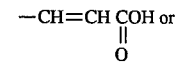

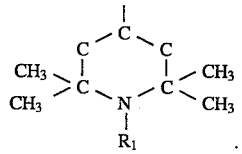

More preferred examples are compounds represented by the formula (I) or (II) wherein $R_2$ is a hydrogen atom or an alkyl group and $R_3$ is a hydrogen atom, an alkyl group, a cycloalkyl group, an alkenyl group or

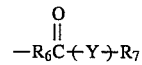

in which Y represents a direct bond, —O— or —$NR_8$— and $R_6$ represents a direct bond, a straight or branched alkylene group of 1–10 carbon atoms, an alkylidene group or arylene group, and $R_7$ and $R_8$ each represents a hydrogen atom, a hydroxyl group, an alkyl group of 1–18 carbon atoms, an aryl group of 6–21 carbon atoms,

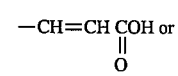

-continued

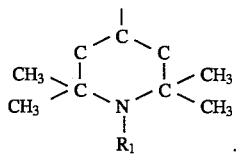

Examples of the compounds are shown below.

4-Amino-2,2,6,6-tetramethylpiperidine, 4-methylamino-2,2,6,6-tetramethyl-4-piperidine, 4-ethylamino-2,2,6,6-tetramethylpiperidine, 4-propylamino-2,2,6,6-tetramethylpiperidine, 4-butylamino-2,2,6,6-tetramethylpiperidine, 4-hexylamino-2,2,6,6-tetramethylpiperidine, 4-octylamino-2,2,6,6-tetramethylpiperidine, 4-dodecanylamino-2,2,6,6-tetramethylpiperidine, 4-diethylamino-2,2,6,6-tetramethylpiperidine, N-(2,2,6,6-tetramethyl-4-piperidyl)piperidine, N-(2,2,6,6-tetramethyl-4piperidyl)acetamide, and N-(1,2,2,6,6-pentamethyl-4-piperidyl)stearoylamide.

Besides, mention may be made of the compounds represented by the following structural formulas.

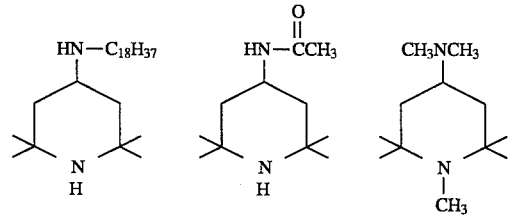

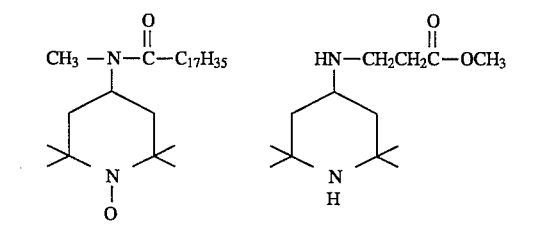

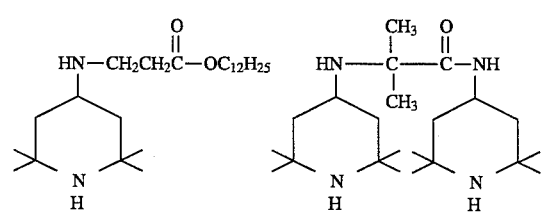

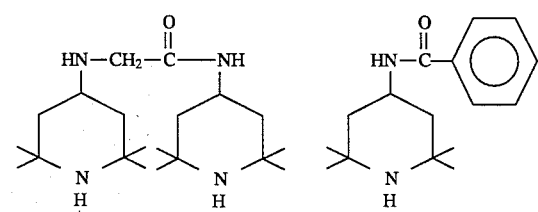

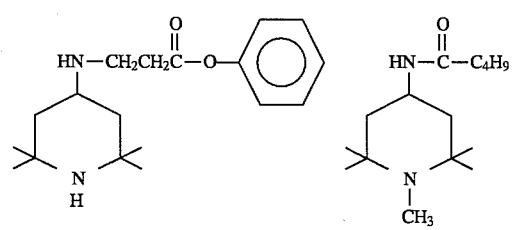

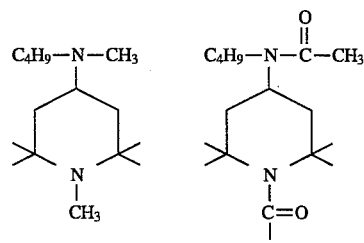

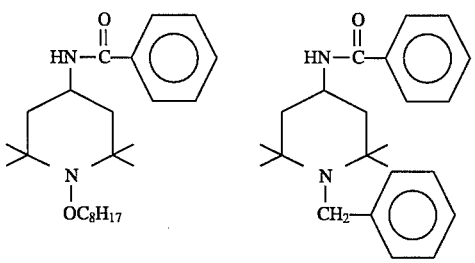

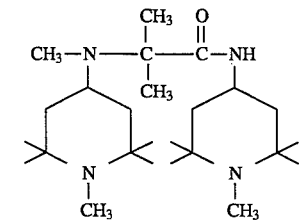

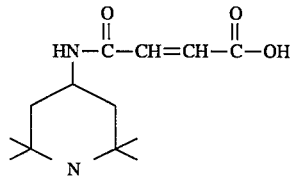

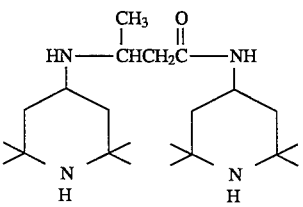

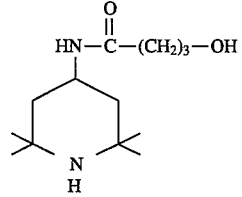

[2] At least one 4-amino-2,2,6,6-tetramethylpiperidyl compounds represented by the formula (I) or (II) wherein n is 2 and $R_3$ is an alkylene group or

in which $R_9$ represents a direct bond a straight or branched alkylene group, an alkylidene group or an arylene group or R₃ is

in which $R_9$ represents a direct bond, a straight or branched alkylene group, an alkylidene group or an arylene group and more preferably $R_9$ represents a direct bond, a straight or branched alkylene group of 1–10 carbon atoms, an alkylidene group or an arylene group such as, for example, ethylene, 1,2-, 1,3-or 1,4-propylene, 1,2-, 1,3- or 1,4-butylene, pentamethylene, 2,2-dimethyl-1,3-propylene, hexamethylene, octamethylene, cyclohexylene, and cyclohexylenedimethylene. Specific examples of the compounds are those which have the following structural formulas.

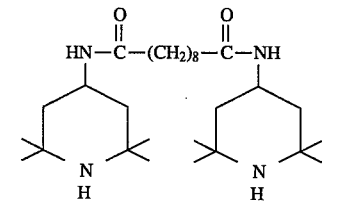

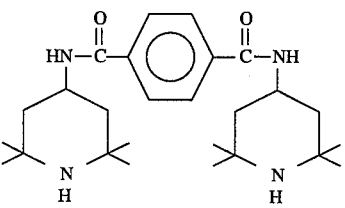

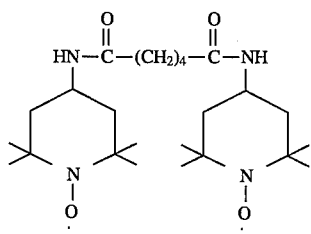

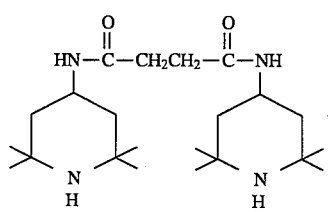

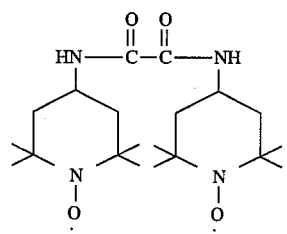

-continued

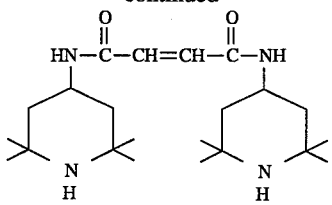

More preferred are those which are represented by the formula (I) or (II) wherein when $R_3$ is an alkylene group, $R_1$ is a hydrogen atom, an oxygen atom (oxy radical), a hydroxyl group, an alkyl group, a cycloalkyl group, an allyl group, a benzyl group, an aryl group, an alkanoyl group, an alkenoyl group, an alkyloxy group or a cycloalkyloxy group and $R_2$ is a hydrogen atom or

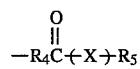

where X represents a direct bond, —O— or —NH—, $R_4$ represents a direct bond, a straight or branched alkylene group, an alkylidene group or an arylene group, $R_5$ represents a hydrogen atom, an alkyl group, an aryl group,

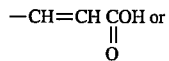

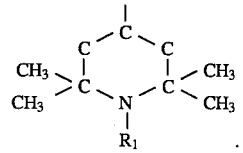

When $R_2$ is a hydrogen atom, $R_1$ is preferably a hydrogen atom, a hydroxyl group, an alkyl group of 1–10 carbon atoms or an alkyloxy group of 1–10 carbon atoms, more preferably a hydrogen atom or a methyl group. As specific examples of the compounds, mention may be made of N,N'-bis(2,2,6,6-tetramethyl-4-piperidyl)-1,6-hexanediamine, N,N'-bis(2,2,6,6-tetramethyl-4-piperidyl) ethylenediamine, N,N'-bis(2,2,6,6-tetramethyl-4-piperidyl)- 1,4-butanediamine, and N,N'-bis(2,2,6,6-tetramethyl- 4-piperidyl)-1,8-octanediamine.

Compounds represented by the formulas where $R_1$ is a hydrogen atom or a methyl group and $R_2$ is a hexamethylene group are preferred and of these compounds, N,N'-bis(2,2,6,6-tetramethyl-4-piperidyl)-1,6-hexanediamine is especially preferred.

When $R_2$ is an alkyl group, $R_1$ can be, for example, a hydrogen atom, a hydroxyl group, an alkyl group of 1–10 carbon atoms such as methyl, ethyl or propyl, or an alkyloxy group of 1–10 carbon atoms and further includes cyclic ones such as cyclohexylmethyl and cyclohexylethyl in addition to straight or branched ones when the carbon number is 3 or more. $R_1$ is preferably a hydrogen atom or a methyl group. $R_3$ is preferably an alkylene group of 2–8 carbon atoms and includes alkylene groups represented by —$C_nH_{2n}$— such as ethylene, 1,2- or 1,3-propylene, 1,2-, 1,3- or 1,4-butylene, pentamethylene, 2,2-dimethyl-1,3-propylene, hexamethylene and octamethylene, and cyclohexylene and cyclohexylenedimethylene.

$R_2$ is preferably an alkyl group of 1–18 carbon atoms or an alkyloxy group of 1–18 carbon atoms. Examples are methyl, ethyl, propyl, isopropyl, n-butyl, isobutyl, t-butyl, sec-butyl, n-pentyl, n-hexyl, 2-ethylhexyl, n-octyl, 1,1,3,3-tetramethylbutyl, n-decyl, n-dodecyl, n-octadecyl, cyclohexyl, 3,3,5-trimethylcyclohexyl, cyclooctyl and cyclodecyl.

When $R_2$ is

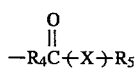

where X represents a direct bond, —O— or —NH—, $R_4$ represents a direct bond, a straight or branched alkylene group, an alkylidene group or an arylene group, $R_5$ represents a hydrogen atom, an alkyl group, an aryl group, —CH=CHCOH or
          ||
          O

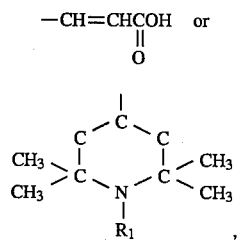

$R_1$ can be, for example, a hydrogen atom, a hydroxyl group, an alkyl group of 1–10 carbon atoms such as methyl, ethyl and propyl or an alkyloxy group of 1–10 carbon atoms and can further include cyclic groups such as cyclohexylmethyl and cyclohexylethyl in addition to straight or branched groups when the carbon number is 3 or more. $R_1$ is preferably a hydrogen atom or a methyl group.

$R_3$ is preferably an alkylene group of 2–8 carbon atoms and includes alkylene groups represented by —$C_nH_{2n}$— such as ethylene, 1,2- or 1,3-propylene, 1,2-, 1,3- or 1,4-butylene, pentamethylene, 2,2-dimethyl-1,3-propylene, hexamethylene and octamethylene, and cyclohexylene and cyclohexylenedimethylene.

$R_4$ is preferably a hydrogen atom or an alkyl group of 1–18 carbon atoms. Examples of the alkyl group are methyl, ethyl, propyl, isopropyl, n-butyl, isobutyl, t-butyl, sec-butyl, n-pentyl, n-hexyl, 2-ethylhexyl, n-octyl, 1,1,3,3-tetramethylbutyl, n-decyl, n-dodecyl, n-octadecyl, cyclohexyl, 3,3,5-trimethylcyclohexyl, cyclooctyl and cyclodecyl.

$R_3$ is preferably hexamethylene group of 6 carbon atoms.

[3] At least one 4-amino-2,2,6,6-tetramethylpiperidyl compound represented by the formula (I) or (II) wherein n is 3 and $R_3$ is

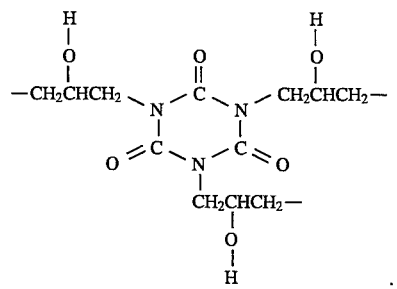

Examples are those which are represented by the following structural formulas.

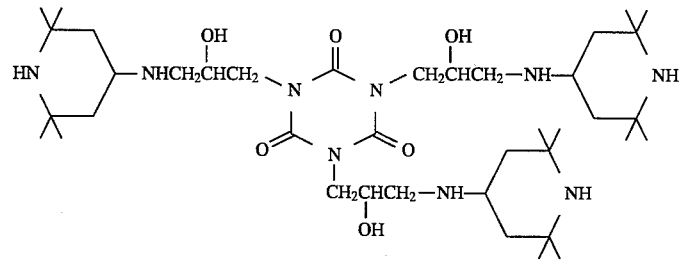

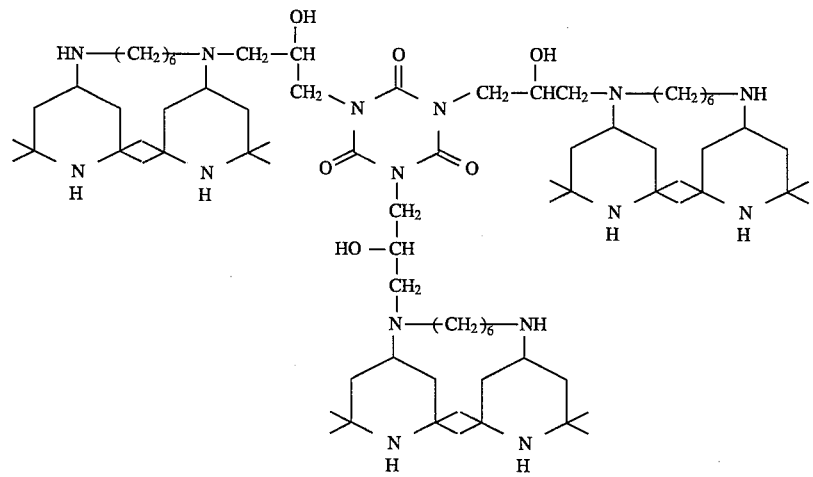

[4] At least one 4-amino-2,2,6,6-tetramethylpiperidyl compounds represented by the formula (I) or (II) wherein n is 4 and $R_3$ is

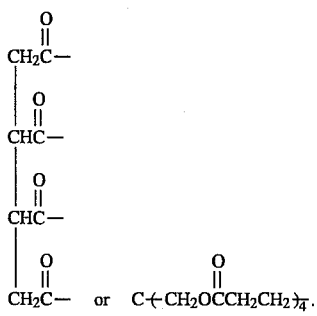

Examples are those which are represented by the following structural formulas.

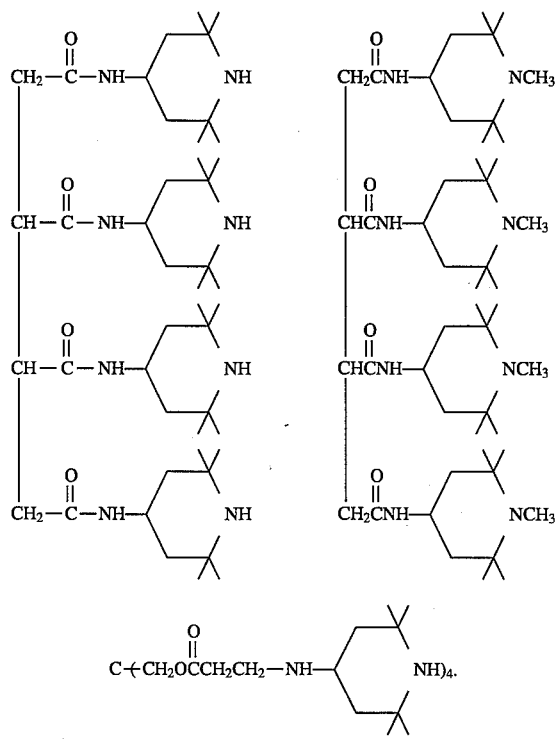

Amount of the component (b) is 0.001–15 parts by weight, preferably 0.1–10 parts by weight based on 100 parts by weight of the polyphenylene ether resin. If it is smaller than 0.001 part by weight, no effect to inhibit gelation is seen and if it is larger than 15 parts by weight, problems such as foaming occur at the time of actual use owing to volatile components.

The thermoplastic resin composition of the present invention is obtainable by blending the component (a) and the component (b) by conventional methods and melt kneading the blend. The component (b) may be added at the time of polymerization of the component (a).

The thermoplastic resin composition of the present invention can be molded by various methods such as injection molding, blow molding, sheet molding, film molding and vacuum forming. The blow molding, sheet molding and film molding are most suitable since the composition is highly prevented from deterioration due to heat. The resulting molded articles can be widely used as packaging materials, household appliances, and exterior and interior trim parts of automobiles.

The present invention will be explained in more detail by the following nonlimiting examples. In examples and comparative examples, polyphenylene ether and additives are kneaded by a batch type small kneader at 300° C. and 90 rpm for 30 minutes and change in torque was examined. Due to melting of polyphenylene ether, torque decreased and, thereafter, gelation occurred by crosslinking with deterioration of polyphenylene ether and torque increased much. With further advance of deterioration, the molten state changed to powdery state to cause decrease of torque.

The following starting materials were prepared for obtaining the compositions in examples and comparative examples.

(Polyphenylene ether resin. PPE):

A polyphenylene ether obtained by homopolymerization of 2,6-dimethylphenol and having an inherent viscosity of 0.46 measured in a chloroform solution (concentration: 0.5 g/dl) at 30° C.

(Additives):

Additive 1: Sanol LS-770 (manufactured by Sankyo Co., Ltd.)

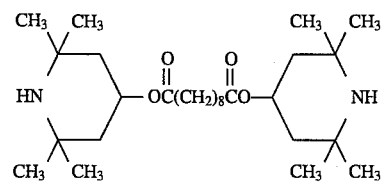

Additive 2: Tinuvin 622 (manufactured by Ciba-Geigy Corp.)

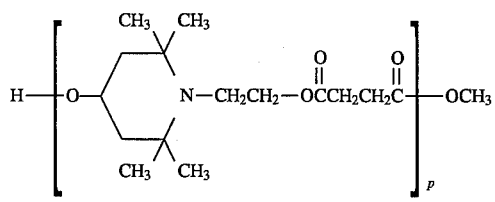

Additive 3: Chimasorb 944 (manufactured by Ciba-Geigy Corp.)

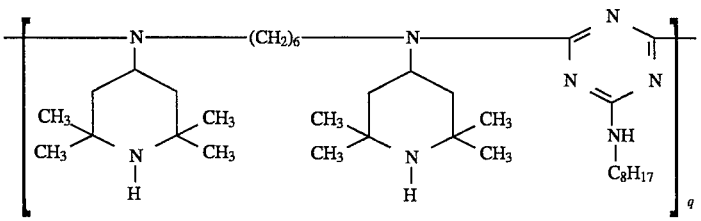

Additive 4: Adekastab PEP-36 (manufactured by Asahi Denka Kogyo K.K.)

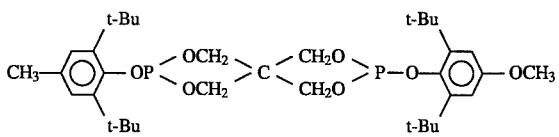

Reference Examples

Preparation examples of the compounds used in Examples are shown below. % in the examples is by weight unless otherwise notified.

Preparation Example 1

Preparation of N,N'-bis(2,2,6,6-tetramethyl-4-piperidyl)-1,6-hexanediamine (Compound 1):

In a 5 liter autoclave were charged 981 g (6.32 mols) of 2,2,6,6-tetramethyl-4-piperidone, 350 g (3.01 mols) of hexamethylenediamine, 1500 g of methanol and 5.0 g of 5% platinum on carbon with keeping the temperature at 45°–55° C. The inside of the autoclave was pressurized to 40 bars with hydrogen and heated to 70°–80° C. to carry out hydrogenation. The hydrogenation was completed after 4–5 hours. The catalyst was removed by filtration at 70°–80° C. under 2–3 bars and 1070 g of N,N'-bis(2,2,6,6-tetramethyl-4-piperidyl)-1,6-hexanediamine was obtained by distillation. Yield: 90%.

Boiling point: 188°–190° C./0.80 millibar.

Preparation Example 2

Preparation of N,N'-bis(2-methoxycarbonylethyl)-N,N'-bis( 2,2,6,6-tetramethyl-4-piperidyl)-1,6-hexanediamine (Compound 2):

In a 1 liter four-necked flask were charged 80 g (0.20 mol) of N,N'-bis(2,2,6,6-tetramethyl-4-piperidyl)-1,6-hexanediamine and 200 g of methanol and the former was completely dissolved. Thereto was added dropwise at room temperature a solution prepared by dissolving 35 g (0.41 mol) of methyl acrylate in 100 g of methanol. Then, reaction was allowed to proceed for 12 hours under reflux. After completion of the reaction, the solvent was distilled off and the residue was recrystallized from hexane to obtain 98 g (0.17 mol) of the desired Compound 2 as a white solid. Yield: 85%.

Melting point: 50°–52° C.

Preparation Example 3

Preparation of N,N'-bis(2-octadecyloxycarbonylethyl)-N,N'-bis(2,2,6,6-tetramethyl-4-piperidyl)-1,6-hexanediamine (Compound 3):

In a four-necked flask provided with a stirrer and a reflux condenser were charged 20 g (35 mmol) of N,N'-bis(2-methoxycarbonylethyl)-N,N'-bis(2,2,6,6-tetra- methyl-4-piperidyl)-1,6-hexanediamine (Compound 2) obtained in Preparation Example 2, 21 g (77 mmol) of stearyl alcohol and 200 ml of toluene, followed by stirring under reflux. Thereto was added dropwise a solution of 0.1 g (4 mmol) of lithium amide in 3 g of methanol. Thereafter, the solvent was distilled off with addition of toluene and the reaction was completed. After the reaction was allowed to proceed for 4 hours, toluene was added, followed by cooling to room temperature. The organic layer was washed with water three times and then concentrated to obtain 23 g (22 mmol) of the desired Compound 3. Yield: 63%.

Melting point: 45°–46° C.

Preparation Example 4

Preparation of N,N'-bis(2-t-butoxycarbonylethyl)-N,N'-bis(2,2,6,6-tetramethyl-4-piperidyl)-1,6-hexanediamine (Compound 4):

The procedure of Preparation Example 3 was repeated except that t-butyl alcohol was used as the starting alcohol, thereby obtaining 13 g of the desired Compound 4.

Melting point: 72°–73° C.

Preparation Example 5

Preparation of N,N'-diacetyl-N,N'-bis(2,2,6,6-tetramethyl- 4-piperidyl)-1,6-hexanediamine (Compound 5):

In a 300 ml four-necked flask were charged 20.7 g (50.7 mmol) of N,N'-bis(2,2,6,6-tetramethyl-4-piperidyl)- 1,6-hexanediamine and 70 g of pyridine and the former was completely dissolved. Thereto was added dropwise 11.64 g (0.114 mol) of acetic anhydride over a period of 30 minutes, followed by stirring for 1 hour at 40° C. After cooling, 100 g of 20% aqueous NaOH and 50 ml of toluene were added and the product was extracted and washed with 50 ml of water. The solvent in the toluene layer was distilled off and the residue was recrystallized from 20 ml of n-hexane to obtain 20.6 g of the desired Compound 5. Yield: 85%

Melting point: 152°–154° C.

Preparation Example 6

Preparation of N,N'-bis(n-hexylcarbonyl)-N,N'-bis(2,2,6, 6-tetramethyl-4-piperidyl)-1,6-hexanediamine (Compound 6):

The procedure of Preparation Example 5 was repeated except that heptanoic anhydride was used in place of acetic anhydride, thereby obtaining 18.8 g of the desired Compound 6.

Melting point: 123°–125° C.

Preparation Example 7

Preparation of N,N'-bis(ethoxycarbonyl)-N,N'-bis(2,2,6,6-tetramethyl-4-piperidyl)-1,6-hexanediamine (Compound 7):

At a temperature of 0° C. or lower, 22.8 g (0.21 mol) of ethyl chlorocarbonate was added to a solution of 39.4 g (0.1 mol) of N,N'-bis(2,2,6,6-tetramethyl-4-piperidyl)- 1,6-hexanediamine in 200 ml of 1,2-dichloroethane which was cooled to −10° C. Then, thereto was added slowly 8.4 g of sodium hydroxide dissolved in 50 ml of water with keeping the temperature at 0° C. Then, the temperature was elevated to 20° C., and the aqueous layer was separated and the organic layer was washed with water and dried over anhydrous sodium sulfate to remove the solvent. Then, the residue was crystallized from octane to obtain 44.1 g of the desired Compound 7. Yield: 82%

Melting point: 125° C.

Preparation Example 8

Preparation of Compound 8:

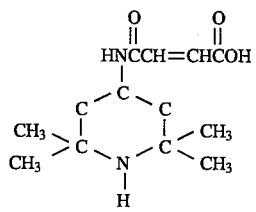

In a four-necked flask provided with a thermometer, a stirrer and a reflux condenser were charged 156 g of 4-amino-2,2,6,6-tetramethylpiperidine, ml of toluene and 98 g of maleic anhydride and the atmosphere in the flask was replaced with nitrogen, followed by keeping the temperature at 60° C. for 6 hours with stirring. After completion of the reaction, the produced white crystal was filtrated and washed with toluene to obtain 243 g of the desired Compound 8.

Preparation Example 9

Preparation of Compound 9

Commercially available 2,2,6,6-tetramethyl-4-piperidylamine was used.

Preparation Example 10

Preparation of methyl 2,2,6,6-tetramethyl-4-piperidylaminopropionate (Compound 10):

7.8 g (0.05 mol) of 2,2,6,6-tetramethyl-4-piperidine and 5.6 g (0.065 mol) of methyl acrylate were allowed to react in 50 g of methanol under reflux for 3 hours.

The solvent was distilled off to obtain 8.0 g of colorless liquid of methyl 2,2,6,6-tetramethyl-4-piperidyl-aminopropionate as a fraction of 130–136° C./1.5 mmHg.

Preparation Example 11

Preparation of Compound 11:

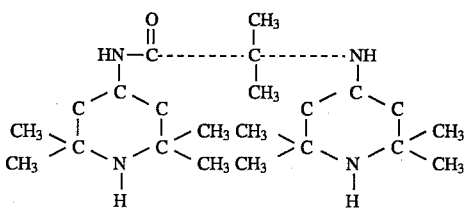

In a four-necked flask provided with a thermometer and a stirrer were charged 156 g of 4-amino-2,2,6,6-tetramethylpiperidine, 32 g of acetone, 239 g of chloroform and 0.4 g of benzyltrimethylammonium chloride and cooled to 5° C. with stirring. Then, thereto was added dropwise 257.6 g of a 50% aqueous potassium hydroxide solution over a period of 1 hour with keeping the inner temperature at 5–10° C., and thereafter, the reaction was allowed to proceed for 5 hours at 0°–10° C.

After completion of the reaction, the aqueous layer was separated and removed. Excess chloroform in the organic layer was ditilled off to obtain 176 g of a white crystal. Yield: 92.6%. Melting point: 127°–128° C. A parent peak 380 was confirmed by FD-mass spectrometry.

Preparation Example 12

Preparation of Compound 12 having the following structural formula:

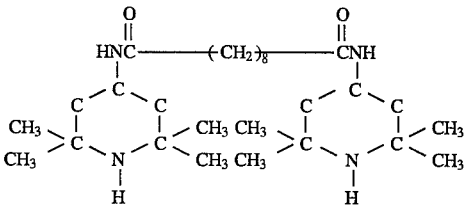

In a four-necked flask provided with a thermometer and a stirrer were charged 156 g of 4-amino-2,2,6,6-tetramethylpiperidine, 400 ml of toluene and 121 g of triethylamine and the atmosphere in the flask was replaced with nitrogen. After the content was cooled to 0° C., thereto was added dropwise 119 g of sebacoyl chloride under stirring with keeping the inner temperature at 0°–5° C. After completion of the addition, 200 mml of a 20% aqueous sodium hydroxide solution was added to dissolve the hydrochloride of triethylamine produced by the reaction. After the aqueous layer was separated and removed, the residue was washed with 100 ml of water. The organic layer was concentrated and the residue was crystallized from n-hexane to obtain 203 g of a white crystal.

Preparation Example 13

Preparation of Compound 13 having the following structural formula:

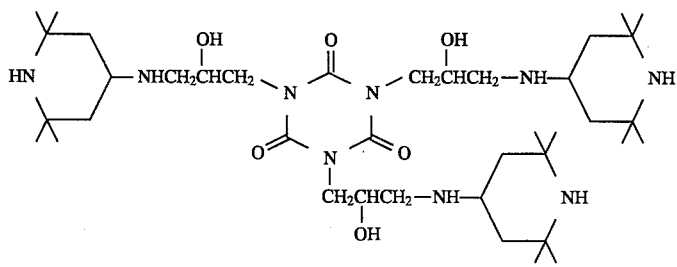

Tris(2,3-epoxypropyl)isocyanurate (29.7 g, 0.1 mol) and 4-amino-2,2,6,6-tetramethylpiperidine (47.5 g, 0.3 mol) were slowly heated in a hot bath under stirring. Heat was generated at about 80° C. Temperature was raised up to 100°±5° C. and the temperature was held for about two hours. After cooling, white powders of tris[2-hydroxy- 3-(2, 2,6,6-tetramethyl-4-piperidylamino)propyl]isocyanurate (74.5 g) was obtained. Yield: 97.4%. Melting point: 55°–60° C.

Example 1

3 Parts by weight of Compound 1 was added to 100 parts by weight of PPE and the mixture was kneaded by a batch type small kneader at 300° C. and 90 rpm for 30 minutes. The change of torque is shown in FIG. 1. It can be seen that no conspicuous increase of torque owing to gelation was seen even after lapse of 30 minutes.

Comparative Example 1

Figure 2:
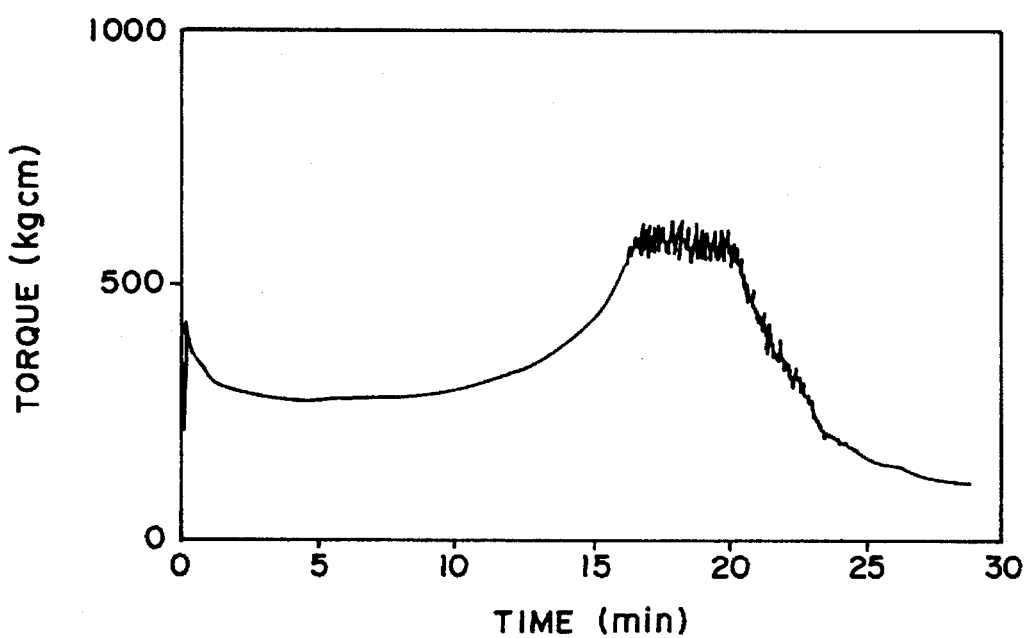
FIG. 2 is a graph which shows the change of torque with time at kneading in Comparative Example 1.

Only 100 parts of PPE was kneaded by a batch type small kneader at 300° C. and 90 rpm for 30 minutes. The change of torque is shown in FIG. 2. A conspicuous increase of torque owing to gelation was seen after lapse of 16 minutes. Hereinafter, the time before the conspicuous gelation occurs (the time required for increase of torque by 40% from the lowest torque) is called gelation time.

Examples 2–14 and Comparative Examples 2–5

Additives added and amount thereof and gelation time are shown in Table 1.

From the above Examples and Comparative Examples it can be seen that the compounds suggested by the present invention are very effective for inhibition of deterioration of polyphenylene ether due to heat at the time of processing.

TABLE 1

|  | PPE | Compound or additive Part by weight | Gelation time (min) |
|---|---|---|---|
| Example 1 | 100 | Compound 1 3 | >30 |
| Comparative example 1 | 100 | — | 16 |
| Example 2 | 100 | Compound 2 3 | >30 |
| Example 3 | 100 | Compound 3 3 | >30 |
| Example 4 | 100 | Compound 4 3 | >30 |
| Example 5 | 100 | Compound 5 3 | >30 |
| Example 6 | 100 | Compound 6 3 | >30 |
| Example 7 | 100 | Compound 7 3 | >30 |

TABLE 1-continued

|  | PPE | Compound or additive Part by weight | Gelation time (min) |
|---|---|---|---|
| Example 8 | 100 | Compound 1 1 | 27 |
| Example 9 | 100 | Compound 8 3 | 29 |
| Example 10 | 100 | Compound 9 3 | 22 |
| Example 11 | 100 | Compound 10 3 | 24 |
| Example 12 | 100 | Compound 11 3 | 22 |
| Example 13 | 100 | Compound 12 3 | 25 |
| Example 14 | 100 | Compound 13 3 | 25 |
| Comparative example 2 | 100 | Additive 1 3 | 19 |
| Comparative example 3 | 100 | Additive 2 3 | 19 |
| Comparative example 4 | 100 | Additive 3 3 | 21 |
| Comparative example 5 | 100 | Additive 4 3 | 19 |

Deterioration of polyphenylene ether caused by the heat at the time of processing can be markedly improved by adding a specific hindered piperidine compound to the polyphenylene ether.

We claim:

1. A thermoplastic resin composition which comprises (a) 100 parts by weight of a polyphenylene ether resin and (b) 0.001–15 parts by weight of at least one 4-amino-2,2,6,6-tetramethylpiperidyl compound represented by the following formula (I):

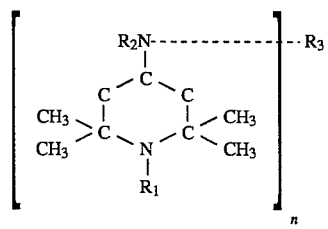

(I)

wherein $R_1$ represents a hydrogen atom, an oxygen atom (oxy radical), a hydroxyl group, an alkyl group having 1–8 carbon atoms, a cycloalkyl group, an allyl group, a benzyl group, an aryl group, an alkanoyl group, an alkenoyl group, an alkyloxy group or a cycloalkyloxy group, and n is an integer of 1 to 4; wherein when n is 1, $R_2$ represents a hydrogen atom, an alkyl group of 1–8 carbon atoms or

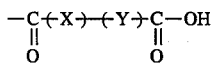

where X and Y represent one selected from the group consisting of an alkylene group, an alkylidene group, a vinyl group and a vinylidene group, and $R_3$ is a hydrogen atom, an alkyl group, a cycloalkyl group, an alkenyl group, a benzyl group, an aryl group or

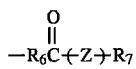

in which Z represents a direct bond, —O— or —$NR_8$— and $R_6$ represents a direct bond, a straight or branched alkylene group, an alkylidene group or an arylene group, and $R_7$ and $R_8$ each represents a hydroxyl group, al alkyl group, an aryl group,

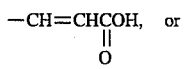

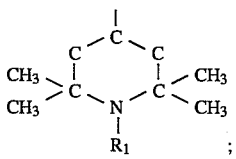

wherein when n is 2, $R_2$ represents a hydrogen atom, an alkyl grup of 1–8 carbon atoms, or

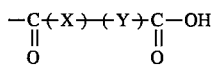

in which X and Y represent one selected from the group consisting of an alkylene group an alkylidene group, a vinyl group, and a vinxylidene group and $R_3$ is an alkylene group or

in which $R_9$ represents a direct bond, a straight or branched alkylene group, an alkylidene group or an arylene group; wherein when n is 3, $R_2$ represents

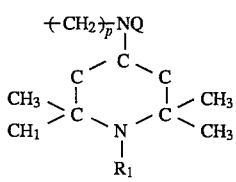

where Q represents a hydrogen atom or an alkyl group of 1–8 carbon atoms and p is an integer of 2 to 8, and $R_3$ is a group represented by the following formula:

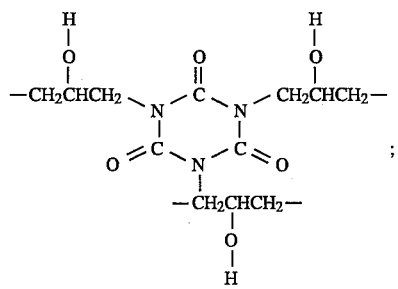

and wherein when n is 4, $R_2$ represents a hydrogen atom or an alkyl group of 1–8 carbon atoms, and $R_3$ is a group represented by the following formula:

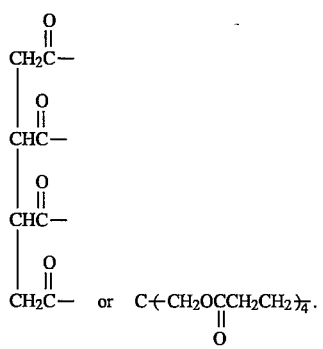

2. A thermoplastic resin composition according to claim 1 wherein the component (b) is a compound represented by the formula (I) wherein $R_1$ and $R_2$ each are a hydrogen atom or an alkyl group of 1–8 carbon atoms and n is 1 or 2 and (1) when n is 1, $R_3$ is a hydrogen atom, an alkyl group, a cycloalkyl group, an alkenyl group or

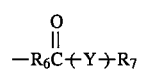

in which Y represents a direct bond, —O— or —$NR_8$— and $R_6$ represents a direct bond, a straight or branched alkylene group of 1–10 carbon atoms, an alkylidene group or arylene group, and $R_7$ and $R_8$ each represent a hydroxyl group, an alkyl group of 1–18 carbon atoms, an aryl group of 6–21 carbon atoms,

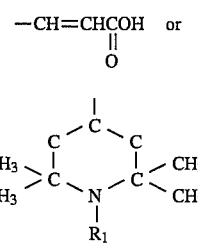

and (2) when n is 2, $R_3$ is

in which $R_9$ represents a direct bond, a straight or branched alkylene group of 1–10 carbon atoms, an alkylidene group or an arylene group.

3. A thermoplastic resin composition according to claim 1 wherein at least one 4-amino-2,2,6,6-tetramethylpiperidyl compound of the component (b) is represented by the formula (I) wherein n is 2 and $R_3$ is an alkylene group.

4. A thermoplastic resin composition according to claim 1 wherein at least one 4-amino-2,2,6,6-tetramethylpiperidyl compound of the component (b) is represented by the formula (I) wherein n is 2, $R_2$ is a hydrogen atom and $R_3$ is an alkylene group.

5. A thermoplastic resin composition according to claim 1 wherein at least one 4-amino-2,2,6,6-tetramethylpiperidyl compound of the component (b) is represented by the formula (I) wherein n is 2, $R_1$ is a hydrogen atom or a methyl group, $R_2$ is a hydrogen atom and $R_3$ is a hexamethylene group.

6. A thermoplastic resin composition according to claim 1 wherein at least one 4-amino-2,2,6,6-tetramethylpiperidyl compound of the component (b) is represented by the formula (I) wherein n is 2, $R_2$ is an alkyl group and $R_3$ is an alkylene group.

7. A thermoplastic resin composition according to claim 1, wherein the compound represented by the formula (I) is at least one compound represented by the following formulas (i)–(iv):

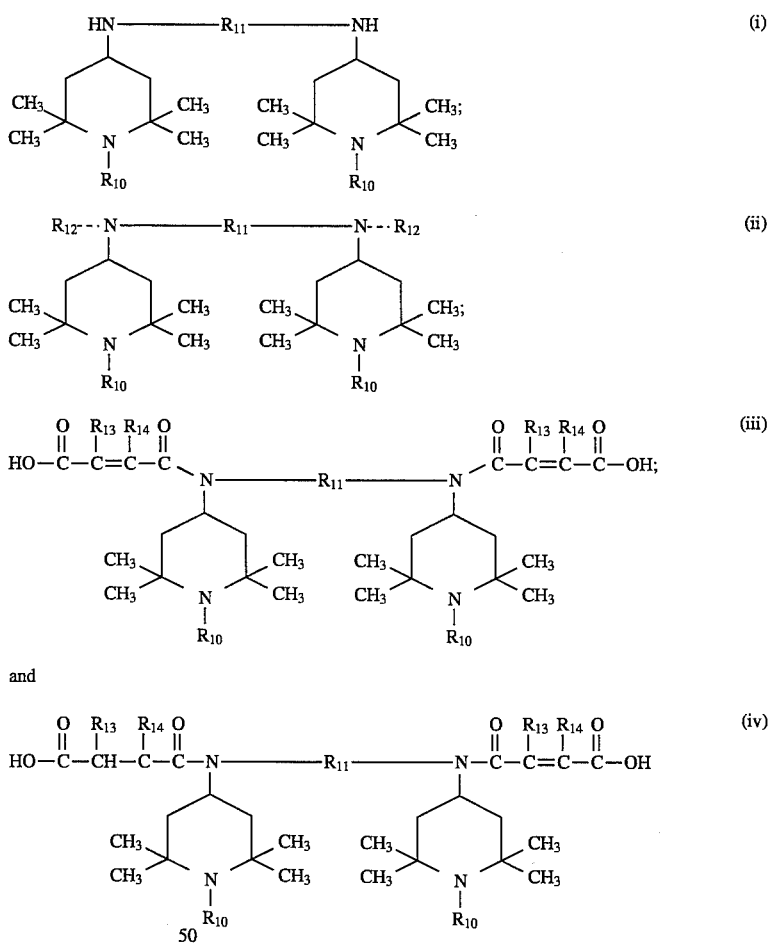

wherein $R_{10}$ represents a hydrogen atom, an alkyl group or an alkyloxy group, $R_{11}$ represents an alkylene group, $R_{12}$ represents an alkyl group, and $R_{13}$ and $R_{14}$ each represents a hydrogen atom or methyl group.

8. A thermoplastic resin composition according to claim 7, wherein in the formula (i), $R_{10}$ is a hydrogen atom, a hydroxyl group, an alkyl group of 1–10 carbon atoms or an alkyloxy group of 1–10 carbon atoms, and $R_{11}$ is an alkylene group of 2–8 carbon atoms.

9. A thermoplastic resin composition according to claim 7, wherein in the formula (i), $R_{10}$ is a hydrogen atom or a methyl group and $R_{11}$ is a hexamethylene group.

10. A thermoplastic resin composition according to claim 7, wherein in the formula (ii), $R_{10}$ is a hydrogen atom, a hydroxyl group, an alkyl group of 1–10 carbon atoms or an alkyloxy group of 1–10 carbon atoms, $R_{11}$ is an alkylene group of 2–8 carbon atoms, and $R_{12}$ is an alkyl group of 1–17 carbon atoms.

11. A thermoplastic resin composition according to claim 7, wherein in the formula (ii), $R_{10}$ is a hydrogen atom or a methyl group.

12. A thermoplastic resin composition according to claim 7, wherein in the formula (iii), $R_1$ is a hydrogen atom, a hydroxyl group, an alkyl group of 1–10 carbon atoms or an alkyloxy group of 1–10 carbon atoms, and $R_n$ is an alkylene group of 2–8 carbon atoms.

13. A thermoplastic resin composition according to claim 7, wherein in the formula (iii), $R_{10}$ is a hydrogen atom or a methyl group.

14. A thermoplastic resin composition according to claim 7, wherein the formula (iv), $R_{10}$ is a hydrogen atom, a hydroxyl group, an alkyl group of 1–10 carbon atoms or an alkyloxy group of 1–10 carbon atoms, and $R_{11}$ is an alkylene group of 2–8 carbon atoms.

15. A thermoplastic resin composition according to claim 7, wherein in the formula (iv), $R_{10}$ is a hydrogen atom or a methyl group.

16. A thermoplastic resin composition according to claim 1, wherein the 4-amino-2,2,6,6-tetramethylpiperidyl compound is a compound having the formula (III)

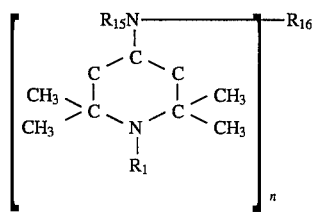

wherein $R_1$ and n are the same as defined above, $R_{15}$ is a hydrogen atom or alkyl group, and (i) when n=1, $R_{16}$ is a hydrogen atom, an alkyl group, a cycloalkyl group, an alkenyl group, a benzyl group, an allyl group or

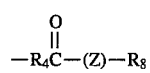

wherein $R_4$, Z and $R_8$ are as defined above, (2) when n=2, $R_{16}$ is

wherein $R_4$ is as defined above, and (4) when n=4, $R_{16}$ is

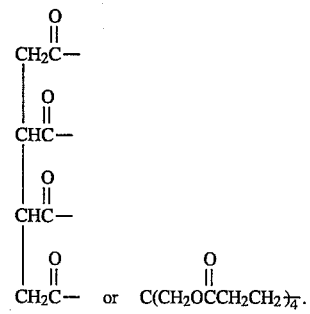

17. A thermoplastic resin composition according to claim 16, wherein the 4-amino-2,2,6,6-tetramethylpiperidyl compound of the formula (III) is one wherein $R_1$ is a hydrogen or an alkyl group of 1–8 carbon atoms, $R_{15}$ is hydrogen or an alkyl group of 1–18 carbon atoms, n=1 or 2, and when n=1, $R_{16}$ is a hydrogen, alkyl group, a cycloalkyl group, an alkenyl group or

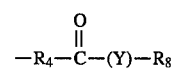

wherein Y is a direct bond, —O— or —$NR_8$—, $R_4$ is a direct bond, a straight or branched alkylene group of 1–10 carbon atoms, an alkylidene group having 1–10 carbon atoms, or an arylene group, and $R_8$ is independently a hydrogen, an alkyl group of 1–18 carbon atoms, an aryl group of 6–21 carbon atoms,

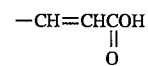

or

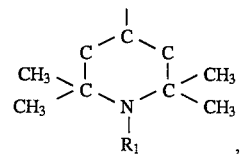

and
when n=2, $R_{16}$ is

wherein $R_4$ is a direct bond, a straight or branched alkylene group of 1–10 carbon atoms, an alkylidene group of 1–10 carbon atoms or an arylene group.

* * * * *

UNITED STATES PATENT AND TRADEMARK OFFICE
CERTIFICATE OF CORRECTION

PATENT NO. : 5,478,873
DATED : December 26, 1995
INVENTOR(S) : Sanada, et. al.

It is certified that error appears in the above-indentified patent and that said Letters Patent is hereby corrected as shown below:

Title page, item [30], change the priority date of Japanese Patent 5-217793 from "September 10, 1993" to --September 1, 1993--.

Signed and Sealed this

Eighth Day of April, 1997

BRUCE LEHMAN

*Attest:*

*Attesting Officer*  *Commissioner of Patents and Trademarks*